(12) United States Patent
Witt

(10) Patent No.: US 8,381,583 B2
(45) Date of Patent: Feb. 26, 2013

(54) METHOD FOR DETERMINING A FUNCTIONING OF A GAS BLEED VALVE

(75) Inventor: Klaus Leonard Witt, Aachen (DE)

(73) Assignee: Sun Test Systems B.V., Weesp (NL)

( * ) Notice: Subject to any disclaimer, the term of this patent is extended or adjusted under 35 U.S.C. 154(b) by 321 days.

(21) Appl. No.: 12/892,644

(22) Filed: Sep. 28, 2010

(65) Prior Publication Data

US 2011/0072881 A1    Mar. 31, 2011

(30) Foreign Application Priority Data

Sep. 29, 2009 (EP) .................... 09171662

(51) Int. Cl.
*F16K 37/00* (2006.01)

(52) U.S. Cl. ........... 73/168; 137/553; 137/557; 137/559

(58) Field of Classification Search ............ 73/168; 137/553–559
See application file for complete search history.

(56) References Cited

U.S. PATENT DOCUMENTS

| | | | |
|---|---|---|---|
| 2,569,299 A * | 9/1951 | Fegel ................... | 73/46 |
| 3,098,382 A * | 7/1963 | Hoffman et al. ........... | 73/168 |
| 3,270,557 A * | 9/1966 | McClocklin ............ | 73/168 |
| 3,699,810 A * | 10/1972 | Takahashi ............. | 73/168 |
| 4,114,426 A * | 9/1978 | McLean ............. | 73/40.5 R |
| 4,184,359 A | 1/1980 | Gracey | |
| 4,294,109 A * | 10/1981 | Peters et al. ........... | 73/114.45 |
| 4,566,310 A * | 1/1986 | Cohen et al. ............. | 73/9 |
| 4,646,556 A * | 3/1987 | Courcoux et al. ......... | 73/1.68 |
| 4,669,500 A * | 6/1987 | Strelow ............... | 137/514 |
| 4,682,495 A * | 7/1987 | McNeely ............. | 73/168 |
| 4,766,765 A * | 8/1988 | Ezekoye .............. | 73/168 |
| 4,926,704 A * | 5/1990 | Survil et al. ............ | 73/866.5 |
| 5,048,329 A * | 9/1991 | Marchini ............ | 73/168 |
| 5,385,012 A * | 1/1995 | Rowe ................ | 60/779 |
| 6,199,432 B1 * | 3/2001 | Dunn ................. | 73/756 |
| RE37,151 E * | 5/2001 | LaFountain ............. | 73/39 |
| 6,223,766 B1 * | 5/2001 | Shaw et al. ........... | 137/315.01 |
| 6,330,890 B1 * | 12/2001 | Ekman ............... | 137/269 |
| 6,557,400 B2 * | 5/2003 | Xiong et al. ............ | 73/112.06 |
| 6,719,002 B2 * | 4/2004 | Shaw ................. | 137/315.01 |
| 6,899,317 B2 * | 5/2005 | Brady et al. ............ | 251/264 |
| 7,210,338 B2 * | 5/2007 | Baird et al. ............ | 73/49.7 |
| 2004/0129317 A1 * | 7/2004 | Bevan ............... | 137/554 |
| 2010/0219289 A1 | 9/2010 | Vieules | |

FOREIGN PATENT DOCUMENTS

| | | |
|---|---|---|
| EP | 0 552 841 A2 | 7/1993 |
| EP | 0 829 648 A1 | 3/1998 |
| EP | 1 926 009 A2 | 5/2008 |
| FR | 2 897 123 A1 | 8/2007 |

* cited by examiner

*Primary Examiner* — David Rogers
(74) *Attorney, Agent, or Firm* — Birch, Stewart, Kolasch & Birch, LLP

(57) ABSTRACT

A method for determining a functioning of a gas bleed valve in a primary reservoir for a medium for a hydraulic system includes connecting a testing apparatus with a separate reservoir of the medium to the primary reservoir; pumping the medium from the separate reservoir to the primary reservoir; measuring the volume of the medium pumped from the separate reservoir to the primary reservoir; and determining the functioning of the gas bleed valve by comparing the volume of the medium pumped to the primary reservoir with: a change of the medium volume measured in the primary reservoir, or a change of the pressure of the medium pumped to the primary reservoir.

20 Claims, 1 Drawing Sheet

METHOD FOR DETERMINING A FUNCTIONING OF A GAS BLEED VALVE

The invention relates to a method for determining a functioning of a gas bleed valve in a primary reservoir for a medium for a hydraulic system.

Gas bleed valves may be used for allowing undissolved gas in a hydraulic system to escape out of a primary reservoir of the system. Determining whether the gas bleed valve is functioning correctly is very important because the hydraulic system may be used for controlling an airplane. If the gas bleed valve is not working correctly undissolved gas may collect in the hydraulic system and controlling the airplane may be jeopardized by the undissolved gas. The undissolved gas may for example interrupt the working of a pump that is used for keeping a medium in the hydraulic system at the right pressure during normal operation. If the working of the pump is interrupted the pressure may drop in the high and the low pressure part of the hydraulic system causing the dissolved gas in the system to escape the solution and increase the amount of undissolved gas in the hydraulic system even more. The gas bleed valve may not be able to allow the undissolved gas to escape from the hydraulic system if the undissolved gas is not in the neighbourhood of the gas bleed valve or the gas bleed valve itself is blocked.

It is desirable to provide a method for determining a functioning of a gas bleed valve in a primary reservoir for a medium for a hydraulic system.

According to an embodiment of the invention there is provided a method for determining a functioning of a gas bleed valve in a primary reservoir of a medium for a hydraulic system, the method comprising:

connecting a testing apparatus with a separate reservoir of the medium to the primary reservoir;

pumping the medium from the separate reservoir to the primary reservoir;

measuring the volume of the medium pumped from the separate reservoir to the primary reservoir; and, determining the functioning of the gas bleed valve by comparing the volume of the medium pumped to the primary reservoir with:

a change of the medium volume measured in the primary reservoir, or a change of the pressure of the medium pumped to the primary reservoir. The testing apparatus may comprise a pressure sensor for measuring the pressure of the medium pumped into the primary reservoir. By measuring a change in the system as a result of pumping medium in the system the correct functioning of the bleed valve can be tested. The primary reservoir may be a piston type reservoir and the method may comprise filling the piston type reservoir until the piston reaches its end stop. A medium volume measurement system may be provided between the separate reservoir and the primary reservoir and the volume of the medium pumped into the primary reservoir may be measured with the medium volume measurement system. The medium volume measurement system may be a position sensor which is connected with the piston of the piston type primary reservoir. The position of the piston as measured with the position sensor may be a measure for the volume of medium in the primary reservoir. Measuring the volume of the medium pumped may comprise reading out a medium level in the separate reservoir of the testing apparatus.

Determining the functioning of the gas bleed valve may comprise determining whether there is a linear relation between volume and pressure. The gas bleed valve may be functioning correct if there is a linear relation between volume and pressure and the gas bleed valve may be malfunctioning if there is no linear relation between the volume and the pressure. The primary reservoir may be a piston type reservoir comprising a medium volume measurement sensor and the method may comprise measuring the change of the medium volume in the primary reservoir with the primary reservoir medium volume measurement sensor. The functioning of the gas bleed valve may comprise calculating a difference between the measured volume of the medium pumped to the primary reservoir and the change of the medium volume measured in the primary reservoir. The gas bleed valve may be working correctly if there is a difference between the measured volume of the medium pumped to the primary reservoir and the change of the medium volume measured in the primary reservoir it self. The hydraulic system may during normal operation comprise a low pressure part and a high pressure part and the primary reservoir may be connected to the low pressure part during testing. The method may further comprise connecting the high pressure part to the separate reservoir via the pressure sensor and pumping medium in the high pressure part during testing as well. Pumping the medium into the primary reservoir and measuring the volume and pressure may be done until a set value of the test pressure e.g. 5-10 Bar may be reached. After the set value of the test pressure is reached the pressure may be maintained and subsequently pumping may be resumed until the volume pumped is between 0 and 100 ml per second.

Embodiments of the invention will be described, by way of example only, with reference to the accompanying drawings in which corresponding reference symbols indicate corresponding parts, and in which.

Figure 1:
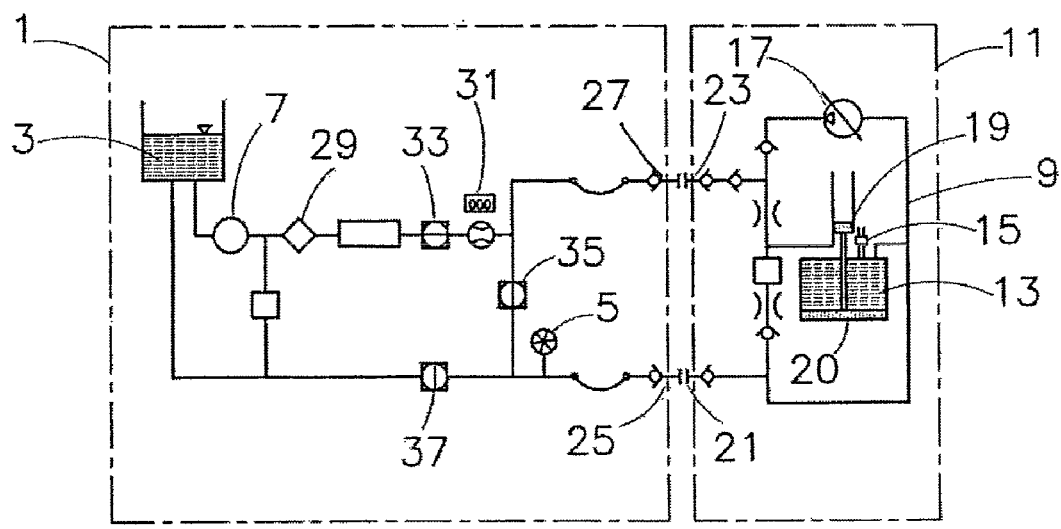
FIG. 1 shows a testing apparatus provided with a separate reservoir, a pump and a pressure sensor connected to a hydraulic system provided with a primary reservoir comprising a gas bleed valve which functioning is determined.

FIG. 1 shows a testing apparatus 1 provided with a separate reservoir 3, a pressure sensor 5 and a pump 7 connected to a hydraulic system 9 of an apparatus 11 to be tested e.g. an airplane.

The hydraulic system 9 is provided with a primary reservoir 13 comprising a gas bleed valve 15 which is used to evacuate gas from the medium e.g. oil in the primary reservoir 13. If there is gas in the medium the working of the hydraulic system 9 can be deteriorated so that the functioning of the apparatus 11 can be hindered. For example, a second pump 17 which during normal operation of the apparatus 11 is used to bring the medium in the high pressure part of the hydraulic system 9 at the required high pressure e.g. 210-350 Bar cannot work if gas is sucked into the second pump 17. The high pressure part of the hydraulic system 9 is used via a first piston 19 to bring the medium at the primary reservoir 13 at a return pressure e.g. 5-10 Bar with a second piston 20 during normal operation of the system. The hydraulic system 9 may be connected via connections 21 and 23 to the testing apparatus 1 during testing.

The testing apparatus 1 may be provided with connections 25, 27 to connect to the apparatus 11. Further the testing apparatus 1 may be provided with a filter 29 to filter the medium and a volume measurement tool 31 for measuring a volume of medium flowing to the apparatus 11 to be tested.

Valves 33, 35 and 37 may be used to control the working of the testing apparatus, as depicted valve 37 is closed while the other valves 33, 35 are open.

After the apparatus 11 to be tested is connected via the connections 25, 27 to the connections 21, 23 of the testing apparatus 1 the primary reservoir 13 will be filled until its maximum. The pump 7 will be used to pump medium from the separate reservoir 3 via the filter 29, the valve 33, the volume measurement tool 31 and the connections 21, 23, 25 and 27 to the primary reservoir 13. The primary reservoir 13 comprises a second piston 20 which moves to its end stop by the medium being pumped in the primary reservoir 3 by the pump 7. When the end stop is reached pumping is stopped. The maximum volume of the reservoir may for example be 14 litres and the pump may for example pump 3 to 4 litre of the medium in the primary reservoir to fill it to its maximum at the end stop from a normal volume of 10 or 11 litres. The pressure measured by the pressure sensor 5 may go from 0 to 2 bars during the pumping and if the end stop is reached the volume measurement tool 31 will give a flow of 0 litre indicating that the primary reservoir is filled. If the gas bleed valve 15 is functioning correctly, any undissolved gas in the hydraulic system 9 may escape out of the primary 13 reservoir of the system. During filling the primary reservoir the volume of medium in the primary reservoir 13 may also be measured. From a comparison of the volume pumped by the testing apparatus 1 and measured by the measurement tool 31 with the volume measured in the primary reservoir 13 the amount of gas that was escaped during pumping can be determined. Often the volume in the reservoir cannot be measured with enough accuracy or reliability to determine a functioning of a gas bleed valve.

After the primary reservoir 13 is completely filled the pressure on the hydraulic system by the testing apparatus is released for a while. Subsequently, the pressure is increased again until the set value of the test pressure e.g. 5-10 Bar is reached and the volume of medium pumped into the hydraulic system is measured as a function of the pressure. The volume can be read out from e.g. a medium level window in the separate reservoir 3, a sensor or by the volume measurement tool 31.

Figure 2A:
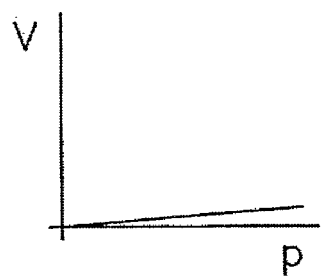
FIG. 2a shows a graph of the volume of a medium pumped into a primary reservoir as a function of the pressure if the gas bleed valve is functioning correctly; and, FIG. 2b shows a graph of the volume of a medium pumped into a primary reservoir as a function of the pressure if the gas bleed valve is malfunctioning.
Figure 2B:
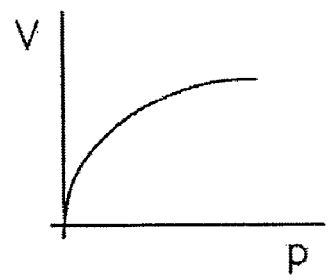

The next step in determining the functioning of the gas bleed valve 15 comprises determining whether there is a linear relation between volume V and pressure P. If there is a linear relation (see FIG. 2a) there is no undissolved gas and the gas bleed valve 15 may be functioning correct. By pumping more medium into the primary reservoir the pressure P is increased rapidly because there is no space where the medium can go and no gas which can be compressed. The gas bleed valve is malfunctioning if there is no linear relation between the volume V and the pressure P (see FIG. 2b). The extra medium pumped into the hydraulic system causes the undissolved gas in the hydraulic system to be compressed and the pressure P is only increasing slowly. In this test the correct functioning of the gas bleed valve for gas in the primary reservoir or in the vicinity of the primary reservoir is tested. If there is undissolved gas somewhere else in the hydraulic system may not be checked with this method. The cause of the malfunctioning of the bleed valve may also not be determined with this method. The malfunctioning can be caused by the bleed valve being broken/blocked or the gas being not in the vicinity of the gas bleed valve.

To determine whether there is no gas in the high pressure part (i.e. the part that is under high pressure e.g. 210-350 Bar during normal operation of the hydraulic system) the pressure is released again and subsequently pumping is resumed until the volume pumped by the pump is between 0 and 100 ml per second. Since the pressure is increased over a longer period of time the test pressure will also reach the high pressure part of the system. If at the test pressure still medium is pumped in the high pressure part of the system there is undissolved gas in the high pressure part of the system.

After the test the pressure on the hydraulic system will be released and the medium will be pumped out of the primary reservoir 13 until the normal level.

In an alternative embodiment of the invention the primary reservoir may be a piston type reservoir and may be provided with a measurement tool for measuring a volume of a medium in the primary reservoir. By comparing the volume of medium pumped into the primary reservoir with an actual volume increase measured in the primary reservoir it is possible to calculate the amount of undissolved gas that was escaping through the gas bleed valve during pumping medium into the primary reservoir until the end stop. Escaping undissolved gas through the gas bleed valve confirms whether the gas bleed valve is functioning.

While specific embodiments of the invention have been described above, it will be appreciated that the invention may be practised otherwise than as described. The descriptions are to be intended to be illustrative, not limiting. Thus it will be apparent to one skilled in the art that modifications may be made to the invention as described without departing from the scope of the claims set out below.

The invention claimed is:

1. A method for determining a functioning of a gas bleed valve in a primary reservoir of a medium for a hydraulic system, the method comprising the steps of:
   connecting a testing apparatus with a separate reservoir of the medium to the primary reservoir;
   pumping the medium from the separate reservoir to the primary reservoir;
   measuring the volume of the medium pumped from the separate reservoir to the primary reservoir; and
   determining the functioning of the gas bleed valve by comparing the volume of the medium pumped to the primary reservoir with:
   a change of the medium volume measured in the primary reservoir, or
   a change of the pressure of the medium pumped to the primary reservoir.

2. The method according to claim 1, wherein the primary reservoir is a piston type reservoir comprising a medium volume measurement sensor and the method comprises the step of measuring the change of the medium volume in the primary reservoir with the primary reservoir medium volume measurement sensor.

3. The method according to claim 1, wherein the hydraulic system during normal operation comprises a low pressure part and a high pressure part and the primary reservoir is connected to the low pressure part during testing, wherein the method comprises the step of connecting the high pressure part to the separate reservoir via the pressure sensor and pumping medium in the high pressure part during testing as well.

4. The method according to claim 1, wherein the testing apparatus comprises a pressure sensor for measuring the pressure of the medium pumped into the primary reservoir.

5. The method according to claim 4, wherein the primary reservoir is a piston type reservoir and the method comprises filling the piston type reservoir until the piston reaches an end stop thereof.

6. The method according to claim 4, wherein a medium volume measurement system is provided between the separate reservoir and the primary reservoir and the volume of the medium pumped is measured with the medium volume measurement system.

7. The method according to claim 4, wherein measuring the volume of the medium pumped comprises reading out a medium level in the separate reservoir.

8. The method according to claim 4, wherein determining the functioning of the gas bleed valve comprises determining whether there is a linear relation between volume and pressure.

9. The method according to claim 1, wherein the primary reservoir is a piston type reservoir and the method comprises the step of filling the piston type reservoir until the piston reaches end stop thereof.

10. The method according to claim 9, wherein determining the functioning of the gas bleed valve comprises determining whether there is a linear relation between volume and pressure.

11. The method according to claim 1, wherein a medium volume measurement system is provided between the separate reservoir and the primary reservoir, and the method comprises the step of measuring the volume of the medium pumped with the medium volume measurement system.

12. The method according to claim 11, wherein determining the functioning of the gas bleed valve comprises determining whether there is a linear relation between volume and pressure.

13. The method according to claim 1, wherein measuring the volume of the medium pumped comprises the step of reading out a medium level in the separate reservoir.

14. The method according to claim 13, wherein determining the functioning of the gas bleed valve comprises determining whether there is a linear relation between volume and pressure.

15. The method according to claim 1, wherein determining the functioning of the gas bleed valve comprises the step of determining whether there is a linear relation between volume and pressure.

16. The method according to claim 15, wherein the gas bleed valve is functioning correct if there is a linear relation between volume and pressure and the gas bleed valve is malfunctioning if there is no linear relation between the volume and the pressure.

17. The method according to claim 1, wherein determining the functioning of the gas bleed valve comprises the step of calculating a difference between the measured volume of the medium pumped to the primary reservoir and the change of the medium volume measured in the primary reservoir.

18. The method according to claim 17, wherein the gas bleed valve is working correct if there is difference between the measured volume of the medium pumped to the primary reservoir and the change of the medium volume measured in the primary reservoir.

19. The method according to claim 1, wherein pumping the medium into the primary reservoir and measuring the volume and pressure is done until a set value of the test pressure is reached.

20. The method according to claim 19, wherein after the set value of the test pressure is reached the pressure is maintained and subsequently pumping is resumed until the volume pumped is between 0 and 100 ml per second.

* * * * *